No. 896,883. PATENTED AUG. 25, 1908.
J. J. BAILEY.
NUT LOCK.
APPLICATION FILED NOV. 19, 1907.
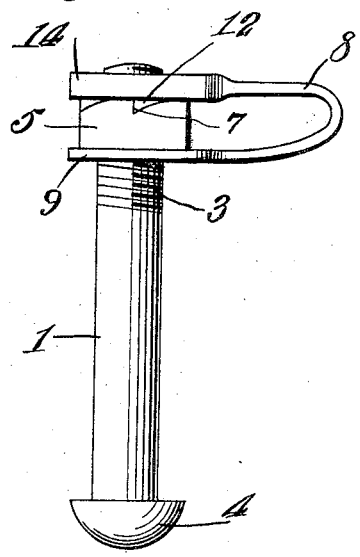
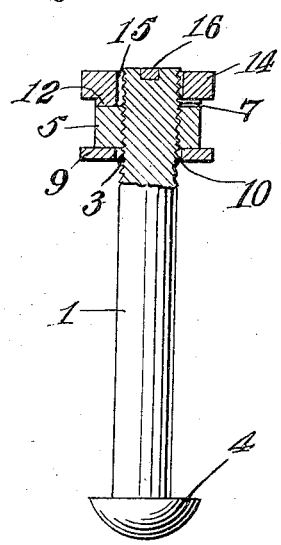
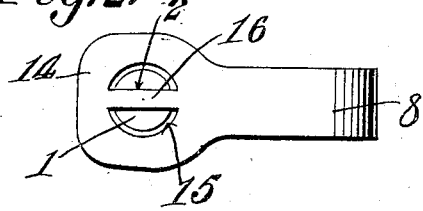
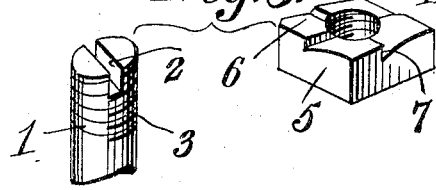
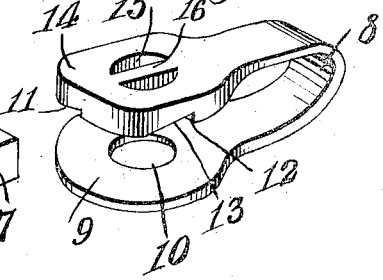
Witnesses
Joe. P. Waller.
R. M. Smith.
Inventor,
James J. Bailey.
By Victor J. Evans.
Attorney

UNITED STATES PATENT OFFICE.

JAMES J. BAILEY, OF HOUSTON, TEXAS.

NUT-LOCK.

No. 896,883.   Specification of Letters Patent.   Patented Aug. 25, 1908.

Application filed November 19, 1907. Serial No. 402,891.

*To all whom it may concern:*

Be it known that I, JAMES J. BAILEY, a citizen of the United States, residing at Houston, in the county of Harris and State of Texas, have invented new and useful Improvements in Nut-Locks, of which the following is a specification.

This invention relates to nut locks, the object of the invention being to provide a nut lock applicable to any bolt of the proper size, any alteration necessary being formation in the bolt or an end slide or groove to receive a corresponding part of the locking device, the said locking device not only serving to lock the nut from turning on the bolt, but also taking the place of the ordinary washer.

The nut lock is also susceptible of repeated use, the efficiency thereof not being impaired by its application to and removal from the bolt.

With the above and other objects in view, the invention consists in the novel construction, combination and arrangement of parts hereinafter fully described, illustrated and claimed.

In the accompanying drawings, Figure 1 is a side elevation of a bolt with the improved nut lock applied thereto. Fig. 2 is a plan view of the nut lock *per se*. Fig. 3 is a sectional elevation of the bolt and nut showing the relation of the locking device thereto. Fig. 4 is a perspective view of the nut lock detached. Fig. 5 illustrates the nut and grooved end of the bolt in perspective.

Referring to the drawings, 1 designates a bolt which for the purpose of this invention is provided in its threaded extremity with an end groove or slot 2 which preferably extends diametrically across the end of the bolt and is of suitable breadth to receive the tongue of the locking device hereinafter described. In all other respects, the bolt is similar to the common threaded bolt now in use being provided with the threaded portion 3 and head 4.

The nut 5 is provided on one side with a plurality of notches 6 forming a corresponding number of shoulders or teeth 7, the active surfaces of which are perpendicular to the surface of the nut, while the surfaces leading upward thereto are inclined so that the corresponding shoulders or teeth on the locking device hereinafter described will ride upward on the teeth and snap over the same into engagement with the shoulders thereof.

The locking device consists of a strip of spring metal which is bent intermediate its ends to form a recurved spring portion or bend 8. The extremities of the strip are somewhat enlarged as illustrated in Figs. 2 and 4, one of said extremities 9 being provided with a central bolt receiving hole 10, the portion 9 of the locking device forming a washer and being adapted to take the place of the usual washer used on bolts. The other end of the locking device is made somewhat thicker in order to adapt the same to be notched as shown at 11, thereby providing a plurality of locking shoulders 12 corresponding in number with the shoulders 7 of the nut, the notches being so shaped as to provide inclined surfaces 13 which lead inward toward the abrupt shoulders 12 thereby enabling the shoulders of the locking device to ride over and snap into engagement with the shoulders of the nut. The enlarged end portion 14 of the nut lock is further provided with a bolt receiving hole 15 across which extends an integral locking tongue 16 which, when the locking device is in position, snaps into engagement with the end groove or slot 2 in the extremity of the bolt.

The locking device is placed over the threaded end of the bolt with the nut lying between the extremities of the locking device in the manner illustrated in Figs. 1 and 2. Then by means of an S wrench or other suitable implement the nut is turned inward on the bolt to the desired extent, bringing the washer portion 9 of the locking device against the surface of the object through which the bolt passes. In turning the nut, the shoulders of the nut ride over and snap past the shoulders of the spring locking device and when the nut reaches its final position the tongue 16 of the locking device springs or snaps into the terminal groove or slot 2 and thus the locking device is held from turning on the bolt and the nut is also held from turning on the bolt by reason of its interlocked engagement with the locking device.

Having thus fully described the invention, what is claimed as new is:—

The combination with a bolt having a diametrical slot in the end thereof, and a nut provided with shoulders on its outer face, of a nut lock comprising a recurved spring body, and terminal portions bearing against the opposite faces of the nut and provided with holes for the bolt, one of said terminal portions having an integral cross bar to engage the diametrical slot in the bolt and one or more shoulders to engage the shoulders of the nut.

In testimony whereof I affix my signature in presence of two witnesses.

JAMES J. BAILEY.

Witnesses:
  HENRY F. BAILEY,
  JOHN W. MCGINNIS.